United States Patent

Uzawa

(10) Patent No.: US 10,421,321 B2
(45) Date of Patent: Sep. 24, 2019

(54) HEAVY DUTY PNEUMATIC TIRE

(71) Applicant: BRIDGESTONE CORPORATION, Tokyo (JP)

(72) Inventor: Akiko Uzawa, Hamamatsushi (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 431 days.

(21) Appl. No.: 15/104,254

(22) PCT Filed: Sep. 8, 2014

(86) PCT No.: PCT/JP2014/004607
§ 371 (c)(1),
(2) Date: Jun. 14, 2016

(87) PCT Pub. No.: WO2015/097945
PCT Pub. Date: Jul. 2, 2015

(65) Prior Publication Data
US 2016/0311264 A1    Oct. 27, 2016

(30) Foreign Application Priority Data

Dec. 27, 2013    (JP) .................................. 2013-272914

(51) Int. Cl.
*B60C 11/11* (2006.01)
*B60C 11/13* (2006.01)
*B60C 11/03* (2006.01)

(52) U.S. Cl.
CPC ........... *B60C 11/11* (2013.01); *B60C 11/1376* (2013.01); *B60C 11/1353* (2013.01);
(Continued)

(58) Field of Classification Search
CPC ............. B60C 11/1376; B60C 11/1353; B60C 11/1307; B60C 2011/1361;
(Continued)

(56) References Cited

U.S. PATENT DOCUMENTS 4,773,459 A    9/1988  Yamaoka et al.
6,761,197 B2 *  7/2004  Carra ...................... B60C 11/11
                                                           152/209.18
(Continued)

FOREIGN PATENT DOCUMENTS

CN    204340560 U    5/2015
JP    05085110 A  *  4/1993  ............. B60C 11/13
(Continued)

OTHER PUBLICATIONS

Machine Translation: JP-05085110-A; Nakamura, Hiroshi; (Year: 2018).*

(Continued)

*Primary Examiner* — Robert C Dye
*Assistant Examiner* — Kendra Ly
(74) *Attorney, Agent, or Firm* — Sughrue Mion, PLLC

(57) ABSTRACT

This heavy duty pneumatic tire includes a block (6) on a tread surface (1). Shallow grooves are provided in the block. At least one of the shallow grooves (7, 9, 31, 32) is a raised bottom shallow groove that is in communication with at least one groove among circumferential grooves and transverse grooves adjacent to the block, extends in a direction intersecting the tire circumferential direction at least in a central portion of the block in the tire width direction, and has a groove depth that is shallower in the central portion of the block in the tire width direction than at an end of the raised bottom shallow groove in the tire width direction, thereby increasing block rigidity while achieving good mud drainage.

18 Claims, 4 Drawing Sheets

(52) U.S. Cl.
CPC ............. *B60C 2011/0351* (2013.01); *B60C 2011/0362* (2013.01); *B60C 2011/0369* (2013.01); *B60C 2011/0372* (2013.01); *B60C 2011/1361* (2013.01); *B60C 2200/06* (2013.01)

(58) Field of Classification Search
CPC ..... B60C 2011/0369; B60C 2011/0362; B60C 2011/0379; B60C 2200/06; B60C 2200/065; B60C 2200/08
USPC ...................................... 152/209.15, 209.22
See application file for complete search history.

(56) References Cited

U.S. PATENT DOCUMENTS

| | | | | |
|---|---|---|---|---|
| 2007/0012389 | A1* | 1/2007 | Ito | B60C 11/0306 152/209.22 |
| 2014/0000776 | A1* | 1/2014 | Nakamura | B60C 11/11 152/209.25 |

FOREIGN PATENT DOCUMENTS

| | | | | |
|---|---|---|---|---|
| JP | 05213012 | A | * | 8/1993 |
| JP | 11-48717 | A | | 2/1999 |
| JP | 2003-136915 | A | | 5/2003 |
| JP | 2004-203268 | A | | 7/2004 |
| JP | 2004-224131 | A | | 8/2004 |
| JP | 2006-151173 | A | | 6/2006 |
| JP | 2007-253718 | A | | 10/2007 |
| JP | 2008-037223 | A | | 2/2008 |
| JP | 2008-155817 | A | | 7/2008 |
| JP | 2008273306 | A | * | 11/2008 |
| JP | 2010-69956 | A | | 4/2010 |
| JP | 2010-125998 | A | | 6/2010 |
| JP | 2010-125999 | A | | 6/2010 |
| JP | 2010125999 | A | * | 6/2010 |
| JP | 2010-274846 | A | | 12/2010 |
| JP | 2012-171591 | A | | 9/2012 |
| JP | 2014-8904 | A | | 1/2014 |

OTHER PUBLICATIONS

Machine Translation: JP-2008273306-A; Tamura, Daisuke; (Year: 2018).*
Machine Translation: JP-2010125999-A; Takada, Motohiro; (Year: 2019).*
Machine Translation: JP-05213012-A; Endo, Kazuyuki; (Year: 2019).*
International Search Report for PCT/JP2014/004607 dated Nov. 25, 2014.

* cited by examiner

HEAVY DUTY PNEUMATIC TIRE

CROSS REFERENCE TO RELATED APPLICATIONS

This application is a National Stage of International Application No. PCT/JP2014/004607 filed Sep. 8, 2014, claiming priority based on Japanese Patent Application No. 2013-272914 filed Dec. 27, 2013, the contents of all of which are incorporated herein by reference in their entirety.

TECHNICAL FIELD

This disclosure relates to a heavy duty pneumatic tire that, on the tread surface, includes blocks defined by two or more circumferential grooves extending continuously in the tire circumferential direction and transverse grooves opening to circumferential grooves adjacent in the tire width direction.

BACKGROUND

Such a heavy duty pneumatic tire can be used in a vehicle, such as a dump truck, that may be used at construction sites, mines, and other locations. The road surfaces on which such a vehicle may be driven include swampy ground where, after a rain, a layer of soft clay several centimeters thick is formed on hard ground.

As such a tire, JP 2012-147944 A (PTL 1) discloses a tire in which one or more shallow grooves are provided in a block that extends across the tire equatorial plane. The shallow grooves have an average groove depth that is shallower than the groove depth of the circumferential grooves adjacent to the block, and at least one of the shallow grooves opens to at least one groove among the circumferential grooves and the transverse grooves adjacent to the block. PTL 1 asserts that providing the shallow grooves improves mud drainage in the contact patch, thereby improving slip resistance, and improves traction performance due to an increase in the edge component, without a large reduction in block rigidity.

CITATION LIST

Patent Literature

PTL 1: JP 2012-147944 A

SUMMARY

Technical Problem

Near the tire equatorial plane, however, where the ground contact pressure is highest when the vehicle is driven straight, the block may break off due to a reduction in rigidity of the block portion (sub-block) adjacent to the shallow grooves, and depending on the width and depth of the shallow grooves, stones may be trapped within the shallow grooves, or mud entering the shallow grooves may remain there, preventing sufficient mud drainage from being obtained.

It would therefore be helpful to provide a heavy duty pneumatic tire that can increase block rigidity while achieving good mud drainage.

Solution to Problem

My heavy duty pneumatic tire includes, on a tread surface, two or more circumferential grooves extending continuously in a tire circumferential direction; a plurality of transverse grooves opening to circumferential grooves, among the two or more circumferential grooves, that are adjacent in a tire width direction; and a block defined by the circumferential grooves and the transverse grooves and extending across a tire equatorial plane; wherein one or more shallow grooves is formed in the block, each of the one or more shallow grooves having an average groove depth that is shallower than a maximum groove depth of the circumferential grooves adjacent to the block; wherein at least one of the one or more shallow grooves is a raised bottom shallow groove that is in communication, directly or via another one of the one or more shallow grooves, with at least one groove among the circumferential grooves and the transverse grooves adjacent to the block, extends in a direction intersecting the tire circumferential direction at least in a central portion of the block in the tire width direction, and has a groove depth that is shallower in the central portion of the block in the tire width direction than at an end of the raised bottom shallow groove in the tire width direction.

My heavy duty pneumatic tire can increase block rigidity while achieving good mud drainage.

The "central portion of the block in the tire width direction" refers to a block portion that is centered on the central position of the block in the tire width direction and has a width in the tire width direction that is 8% of the tread width. The "central position of the block in the tire width direction" refers to the position of the exact center between outermost positions of the block in the tire width direction. The "end of the raised bottom shallow groove in the tire width direction" refers to a portion that, when viewed at a position where the shallow groove is deepest in the groove width direction, has a width in the tire width direction, from the edge of the shallow groove in the tire width direction inward in the tire width direction, that is 5% of the total length of the shallow groove in the tire width direction.

Stating that the raised bottom shallow groove "has a groove depth that is shallower in the central portion of the block in the tire width direction than at an end of the raised bottom shallow groove in the tire width direction" refers to how, when the groove depth of the shallow groove changes along the extending direction of the shallow groove, the groove depth at every position in the central portion of the block in the tire width direction is shallower than the groove depth at every position at the end of the shallow groove in the tire width direction.

The "tread surface" as referred to here is the entire outer circumferential surface of the tire that comes into contact with the road surface when the tire is attached to an applicable rim, filled to a prescribed internal pressure, and rolled while being placed under a load corresponding to the maximum load capability. The "applicable rim" refers to a standard rim ("Design Rim" in the YEAR BOOK of TRA below, and "Measuring Rim" in the STANDARDS MANUAL of ETRTO below) prescribed by the standards below in accordance with tire size. "Prescribed internal pressure" refers to air pressure prescribed by the standards below in accordance with the maximum load capability. The "maximum load capability" refers to the maximum mass that the tire is allowed to bear according to the standards below. The standards are determined by valid industrial standards for the region in which the tire is produced or used, such as the "Year Book" of "THE TIRE AND RIM ASSOCIATION, INC. (TRA)" in the United States of America, the "STANDARDS MANUAL" of "The European Tyre and Rim Technical Organisation (ETRTO)" in Europe, and the "JATMA YEAR BOOK" of the "Japan Automobile Tyre Manufacturers Association (JATMA)" in Japan.

The "tread width" refers to the length, along the tread width direction, between outermost positions of the tread surface in the tire width direction when the tire is attached to an applicable rim, filled to the prescribed internal pressure, and placed under no load.

The "groove depth" is measured from the position at which the groove opens to the tread surface to the position of the groove bottom in a cross-section along the groove width direction when the tire is attached to an applicable rim, filled to the prescribed internal pressure, and placed under no load. The "average groove depth" of the shallow groove refers to the average value of the groove depth along the entire length of the shallow groove when the groove depth of the one or more shallow grooves provided in the block varies by position along the shallow groove.

The "shallow groove" as referred to in this disclosure has a groove width such that the shallow groove is open to the tread surface without opposing groove walls contacting each other within the tread footprint. The "tread footprint" refers to a portion of the tread surface in the circumferential direction that is in contact with the road surface when the tire is attached to an applicable rim, filled to the prescribed internal pressure, and placed under the maximum load capability.

In this disclosure, when the shallow groove in the block branches partway through the block, the branch is considered to be a separate shallow groove from the shallow groove that it branched off from. A plurality of shallow grooves in communication with one another are thus considered to be present.

My heavy duty pneumatic tire preferably satisfies the expressions $$OTD/3 \leq a < OTD/2, \text{ and}$$

$$a < b \leq OTD/2,$$

where Original Tread Depth (OTD) is a maximum groove depth of the circumferential grooves adjacent to the block, a is a minimum groove depth of the raised bottom shallow groove in the central portion of the block in the tire width direction, and b is a maximum groove depth of the raised bottom shallow groove at the end of the raised bottom shallow groove in the tire width direction. As a result, the mud drainage and block rigidity can be further improved.

In my heavy duty pneumatic tire, the raised bottom shallow groove preferably includes an inclined bottom portion where the groove depth of the raised bottom shallow groove increases linearly from a position of a minimum groove depth of the raised bottom shallow groove in the central portion of the block in the tire width direction towards the end of the raised bottom shallow groove in the tire width direction. As a result, the mud drainage and block rigidity can be further improved.

In my heavy duty pneumatic tire, an inclination angle, at an acute angle side, of a groove bottom in the inclined bottom portion of the raised bottom shallow groove is preferably from 5° to 15° relative to the tread surface. As a result, the mud drainage and block rigidity can be further improved.

In my heavy duty pneumatic tire, in a cross-section of the raised bottom shallow groove in a groove width direction, an inclination angle, at an acute angle side, of a groove wall surface of the raised bottom shallow groove in the central portion of the block in the tire width direction is preferably greater than 4° relative to a normal to the tread surface. As a result, the rigidity in the tire circumferential direction at the central portion of the block in the tire width direction can be further improved.

In my heavy duty pneumatic tire, a groove width of the raised bottom shallow groove in the central portion of the block in the tire width direction is preferably equal to or greater than a minimum groove depth of the raised bottom shallow groove in the central portion of the block in the tire width direction. As a result, in the central portion of the block in the tire width direction, the probability of stone trapping occurring in the shallow groove can be reduced.

Advantageous Effect

I can thus provide a heavy duty pneumatic tire that can increase block rigidity while achieving good mud drainage.

DETAILED DESCRIPTION

Embodiments of this disclosure are described below with reference to the accompanying drawings.

Figure 1:
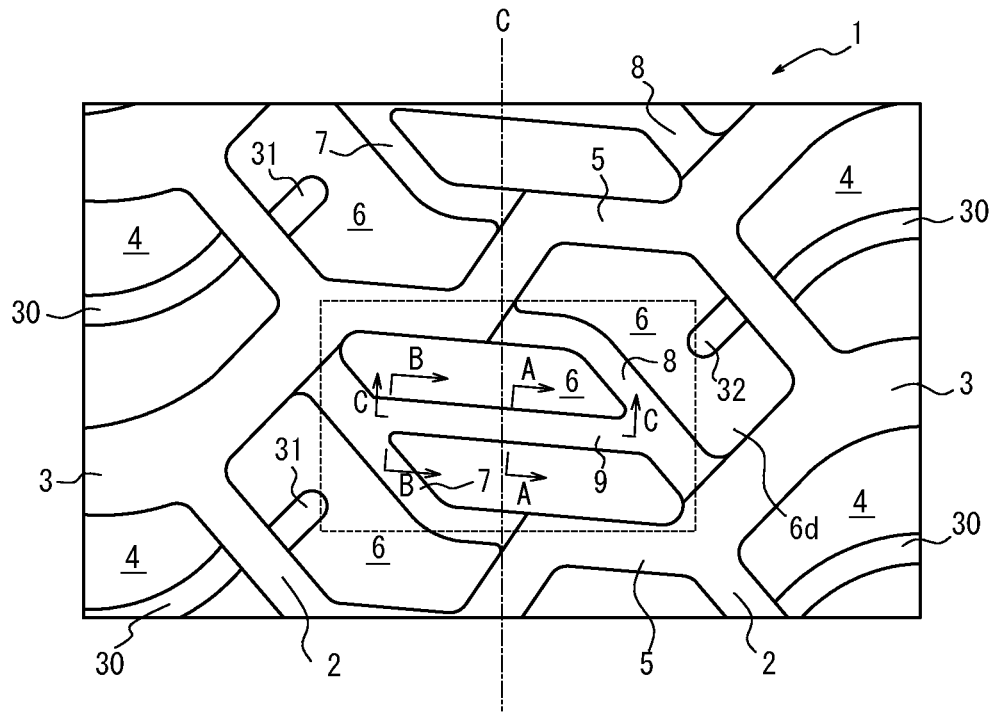
FIG. 1 is a partial developed view of a tread pattern illustrating one of the embodiments.

FIGS. 1 to 3C illustrate a heavy duty pneumatic tire (also referred to below as a "tire") according to one of the embodiments. As illustrated in FIG. 1, reference numeral 1 indicates the tread surface provided in this tire. In this embodiment, two or more (two in the illustrated example) circumferential grooves 2 extending continuously in the tire circumferential direction, for example in a zigzag shape as in the illustrated example, are disposed on the tread surface 1 on either side of the tire equatorial plane C. Furthermore, transverse grooves 5 opening to two circumferential grooves 2 that are adjacent in the tire width direction are provided on the tread surface 1, for example at bending locations where the circumferential grooves 2 protrude inward in the tire width direction as in the illustrated example. A plurality of blocks 6 that extend across the tire equatorial plane C are defined by the circumferential grooves 2 and the transverse grooves 5.

In the illustrated example, the position at exactly the center between outermost positions of the block 6 in the tire width direction (also referred to below as the "central position of the block 6 in the tire width direction") lies on the tire equatorial plane C.

One or more (five in the illustrated example) shallow grooves 7-9, 31, 32 having an average groove depth that is shallower than the maximum groove depth of the circumferential grooves 2 adjacent to the block 6 are provided in each block 6. In the illustrated example, four block portions (sub-blocks) defined by the shallow grooves 7-9 constitute one block 6. At least one of the shallow grooves 7-9, 31, 32 (in the illustrated example, four shallow grooves 7, 8, 31, 32) is in communication, directly or via another shallow groove, with at least one groove among the circumferential grooves 2 and the transverse grooves 5 adjacent to the block 6. As a result, when driven on a road surface where a layer of soft clay is formed on hard ground, mud of the layer of soft clay located in the block 6 is taken into the shallow grooves 7-9, 31, 32 provided on the block 6 and flows to the circumferential grooves 2 and transverse grooves 5 into which the shallow grooves 7, 8, 31, 32 open, thereby yielding good mud drainage. Furthermore, mud becomes less likely to remain at the kick-out side of the block surface (in the illustrated example, the tire rotation direction may be either the upwards or downwards direction in the figure; therefore, either side of each block in the tire circumferential direction may become the kick-out side). Therefore, the edge effect at the kick-out side can be sufficiently obtained, and the traction force and braking force can be effectively transmitted to the road surface.

In the illustrated example, one end of the shallow grooves 7 and 8 opens to one of the circumferential grooves 2 adjacent to the block 6, whereas the other end opens to one of the transverse grooves 5 adjacent to the block 6. One end of the shallow grooves 31 and 32 opens to respective circumferential grooves 2 adjacent to the block 6, whereas the other end terminates within the land portion of the block 6. One end of the shallow groove 9 opens to the shallow groove 7, whereas the other end opens to the shallow groove 8. In other words, via the shallow grooves 7 and 8, the shallow groove 9 is in communication with the circumferential grooves 2 and the transverse grooves 5 adjacent to the block 6. Further, as illustrated, the shallow grooves 7 and 9 and the shallow grooves 8 and 9 each for a T shape.

Being "in communication directly" refers to being in communication without the interposition of another groove. "Communication" refers to one groove opening to another groove, or to grooves intersecting.

In this example, lug grooves 3 that extend from the tread edge and open to the circumferential grooves 2 are further included on the tread surface 1. Lugs 4 are defined between lug grooves 3 that are adjacent the tire circumferential direction. Opening grooves 30 that have a groove depth shallower than that of the circumferential grooves 2, extend from the tread edge in the tire width direction while curving, and open to the circumferential grooves 2 are provided in the lugs 4.

Figure 2:
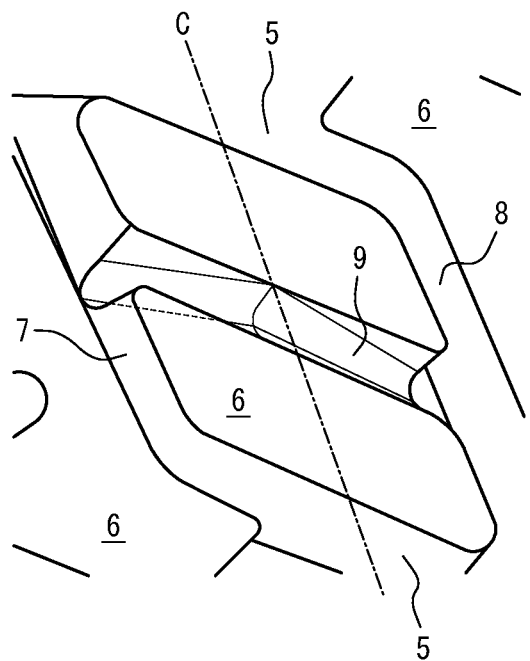
FIG. 2 is an enlarged perspective view illustrating the portion in FIG. 1 enclosed by a dashed line.

As illustrated in the enlarged perspective view of FIG. 2, at least one of the shallow grooves 7-9, 31, 32 (in the illustrated example, the shallow groove 9) is a raised bottom shallow groove that is in communication, directly or via another shallow groove, with at least one groove among the circumferential grooves 2 and transverse grooves 5 adjacent to the block, extends in a direction (approximately the tire width direction in the illustrated example) intersecting the tire circumferential direction at least in a central portion of the block 6 in the tire width direction, and has a groove depth that is shallower in the central portion of the block 6 in the tire width direction than at an end of the shallow groove 9 in the tire width direction.

In the illustrated example, the groove bottom of this raised bottom shallow groove 9 becomes gradually higher outward in the tire radial direction (i.e. towards the tread surface 1) from the ends of the shallow groove 9 in the tire width direction to the central position in the tire width direction. As a result, the groove depth of the block 6 is deepest (depth b in FIG. 3B) at the ends of the shallow groove 9 in the tire width direction and is shallowest (depth a in FIG. 3A) at the central position of the shallow groove 9 in the tire width direction (the position of the tire equatorial plane C in this example). The "central position of the shallow groove 9 in the tire width direction" refers to the position of the exact center between ends of the shallow groove 9 in the tire width direction.

In this way, the rigidity in the tire circumferential direction in the central portion of the block 6 in the tire width direction can be sufficiently guaranteed by making the groove depth of the raised bottom shallow groove 9 relatively shallower in the central portion of the block 6 in the tire width direction. In general, when driving straight, the highest ground contact pressure, and hence the highest traction, is produced near the tire equatorial. plane C. Therefore, if the rigidity in the tire circumferential direction were not sufficiently guaranteed in the central portion of the block 6 in the tire width direction, the block portion (sub-block) adjacent to the shallow groove 9 in the tire circumferential direction would deform easily in the tire circumferential direction. As a result, in this case, stone trapping might occur as follows: when ground contact pressure is produced at that location upon stepping-in during straight driving, the shallow groove 9 first deforms in the opening direction, and a stone enters the shallow groove 9; subsequently, the shallow groove 9 deforms in the closing direction, trapping the stone. Block breakoff might also occur due to the block portions near the groove walls of the shallow groove 9 breaking off. Accordingly, the occurrence of stone trapping in the shallow groove 9 and of block breakoff near the shallow groove 9 can be reduced by sufficiently guaranteeing rigidity in the tire circumferential direction in the central portion of the block 6 in the tire width direction.

At the same time, by setting the groove depth at the ends of the raised bottom shallow groove 9 in the tire width direction to be deeper than the groove depth in the central portion of the block 6 in the tire width direction, mud that has entered into the shallow groove 9 can flow to the outside of the raised bottom shallow groove 9 in the tire width direction more easily than, for example, when the groove depth of the raised bottom shallow groove 9 is constant along the entire length thereof. Hence, the mud drainage and slip resistance can be improved, and the edge effect of the groove can be sufficiently achieved.

In order to improve mud drainage, the groove depth of the raised bottom shallow groove 9 preferably becomes deeper gradually from the central portion of the block 6 in the tire width direction to the ends of the shallow groove 9 in the tire width direction, as in this example. As used here, "becomes deeper gradually" is not limited to the case of becoming deeper continuously (smoothly) as in this example, but also includes the case of becoming deeper intermittently (stepwise). In other words, "becomes deeper gradually" refers to not becoming shallower along the way. In order to improve mud drainage, the depth more preferably increases continuously from the central portion of the block 6 in the tire width direction to the ends of the shallow groove 9 in the tire width direction.

The expressions $$OTD/3 \le a < OTD/2 \quad (1)$$

$$a < b \le OTD/2 \quad (2)$$

are preferably satisfied, where OTD is the maximum groove depth of the circumferential grooves 2 adjacent to the block 6, a is the minimum groove depth of the raised bottom shallow groove 9 in the central portion of the block 6 in the tire width direction (in this example, the minimum value of the groove depth along the entire raised bottom shallow groove 9, which is obtained at the central position of the block 6 in the tire width direction), and b is the maximum groove depth at the end of the raised bottom shallow groove 9 in the tire width direction (in this example, the maximum value of the groove depth along the entire raised bottom shallow groove 9, which is obtained at the end of the raised bottom shallow groove 9 in the tire width direction).

In Expression (1), by $OTD/3 \le a$ being satisfied, a sufficient amount of mud flows from the tread surface 1 into the raised bottom shallow groove 9 in the central portion of the block 6 in the tire width direction, yielding sufficient mud drainage. By $a < OTD/2$ being satisfied, the rigidity in the tire circumferential direction at the central portion of the block 6 in the tire width direction can be sufficiently improved. Furthermore, in Expression (2), by $b \le OTD/2$ being satisfied, the rigidity in the tire circumferential direction of the block portions adjacent to the raised bottom shallow groove 9 is prevented from reducing excessively, thereby effectively preventing the occurrence of stone trapping and block breakoff.

The position in the tire width direction at which the minimum groove depth along the entire raised bottom shallow groove 9 is taken (in this example, the position of the tire equatorial plane C) is preferably disposed in a tire width direction range that is centered on the tire equatorial plane C and has a width, in the tire width direction, that is 25% of the entire length of the shallow groove 9 in the tire width direction. As a result, near the tire equatorial plane C where the highest ground contact pressure is produced during straight driving, the rigidity in the tire circumferential direction of the block portions adjacent to the shallow groove 9 can be sufficiently guaranteed.

The innermost position in the tire width direction of the portion at which the maximum groove depth along the entire raised bottom shallow groove 9 is taken (in this example, the position at the end of the raised bottom shallow groove 9 in the tire width direction) is preferably disposed in a tire width direction range that extends inward in the tire width direction, from the end of the raised bottom shallow groove 9 in the tire width direction, and has a length that is 5% of the entire length of the shallow groove 9 in the tire width direction. As a result, the rigidity in the tire circumferential direction of the block portions adjacent to the raised bottom shallow groove 9 is prevented from reducing excessively.

In this example, the groove depth along the entire shallow grooves 7, 8 that are in communication with the raised bottom shallow groove 9 is the same as the groove depth b at the ends of the raised bottom shallow groove 9 in the tire width direction. As a result, mud that flows out of the raised bottom shallow groove 9 smoothly flows into the shallow grooves 7, 8 and from there to the circumferential grooves 2 or transverse grooves 5 that are in communication with the shallow grooves 7, 8 and have a greater groove depth. Good mud drainage is thus obtained.

Figure 4:
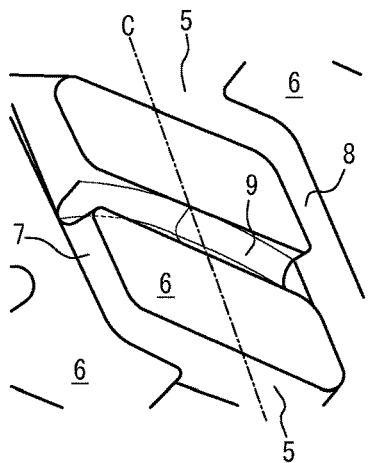
FIG. 4 is an enlarged perspective view illustrating a modification to the portion illustrated in FIG. 2.
Figure 5:
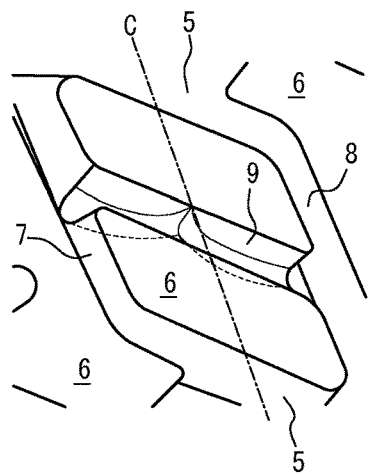
FIG. 5 is an enlarged perspective view illustrating another modification to the portion illustrated in FIG. 2.

As in the example in FIG. 2, the raised bottom shallow groove 9 preferably includes an inclined bottom portion where the groove depth of the raised bottom shallow groove 9 increases linearly from the position of minimum groove depth in the central portion of the block 6 in the tire width direction towards the ends of the raised bottom shallow groove 9 in the tire width direction (in this example, the inclined bottom portion is included along the entire length of the raised bottom shallow groove 9). As a result, the block rigidity and the mud drainage in the shallow groove can be further improved. By contrast, for example as in the modification illustrated in FIG. 4, the raised bottom shallow groove 9 may include a convex bottom portion where, from the position of minimum groove depth in the raised bottom shallow groove 9 towards the ends in the tire width direction, the groove depth increases in a cross-section along the groove width center so that the groove bottom has a convex shape facing outwards in the tire radial direction. In this case, while the block rigidity can be further improved, the mud drainage in the shallow groove 9 cannot be greatly improved. For example as in another modification illustrated in FIG. 5, the raised bottom shallow groove 9 may include a concave bottom portion where, from the position of minimum groove depth in the raised bottom shallow groove 9 towards the ends in the tire width direction, the groove depth increases in a cross-section along the groove width center so that the groove bottom has a concave shape facing outwards in the tire radial direction. In this case, while the mud drainage can be further improved in the shallow groove 9, the block rigidity cannot be greatly improved.

Figure 3A:
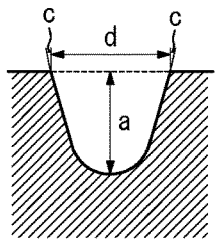
FIGS. 3A, 3B, and 3C are respectively cross-sectional diagrams along A-A B-B, and C-C in FIG. 1.
Figure 3B:
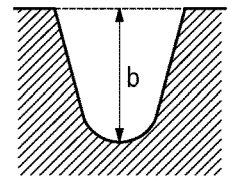
Figure 3C:
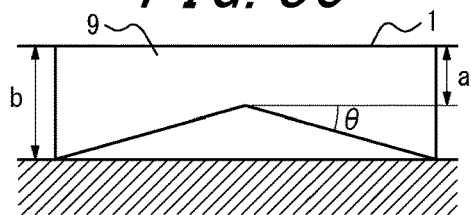

Returning to the example in FIG. 2, in the cross-section along the groove width center of the raised bottom shallow groove 9 illustrated in FIG. 3C, the inclination angle θ, at an acute angle side, of the groove bottom in the inclined bottom portion of the raised bottom shallow groove 9 is preferably from 5° to 15° relative to a plane parallel to the tread surface 1 at the groove wall of the raised bottom shallow groove 9. As a result, the block rigidity and the mud drainage in the shallow groove can be further improved.

In a cross-section of the raised bottom shallow groove 9 in the groove width direction at the central portion of the block 6 in the tire width direction, as illustrated in FIG. 3A, the inclination angle (groove deflection angle) c, at the acute angle side, of the groove wall surface of the raised bottom shallow groove 9 is preferably greater than 4° relative to a normal to the tread surface 1 ($4° < c$). As a result, in the central portion of the block 6 in the tire width direction, the angle of the block angle portion defined by the groove wall surface of the raised bottom shallow groove 9 and the tread surface 1 increases. Therefore, the rigidity in the tire circumferential direction of the block portion near the groove wall of the raised bottom shallow groove 9 can be further improved, and the likelihood of block breakoff occurring can be further reduced.

An excessive increase in the groove deflection angle c, however, leads to an excessive reduction in block volume and a reduction in block rigidity. Therefore, the relationship $c < 45°$ is preferably satisfied.

The groove width d of the raised bottom shallow groove 9 in the central portion of the block 6 in the tire width direction is preferably greater than or equal to the minimum groove depth a of the raised bottom shallow groove 9 in the central portion of the block 6 in the tire width direction ($a \le d$). As a result, as compared to when the groove depth a is constant at $a > d$, the groove width of the raised bottom shallow groove 9 can be sufficiently guaranteed in the central portion of the block in the tire width direction, and the likelihood of stone trapping occurring in the raised bottom shallow groove 9 can be further reduced.

Increasing the groove width d excessively while the groove depth a remains constant, however, leads to an excessive reduction in block volume and a reduction in the block rigidity. Therefore, the relationship d<2a is preferably satisfied.

The groove deflection angle and the groove width of the raised bottom shallow groove 9 are allowed to vary but are preferably each constant along the entire length of the raised bottom shallow groove 9, as in this example, since mud can then flow smoothly within the raised bottom shallow groove 9.

In the example in FIG. 1, by forming only the shallow groove 9, which extends across nearly the entire length near the tire equatorial plane C, to be a raised bottom shallow groove, the occurrence of stone trapping and block breakoff, which tend to occur near the tire equatorial plane C where the highest ground contact pressure is produced when driving straight, can be prevented. Furthermore, by setting the groove depth of the other shallow grooves 7, 8, 31, 32 to be nearly constant along the entire length thereof, a large loss in mud drainage is prevented. As necessary, however, the other shallow grooves 7, 8 may be formed as raised bottom shallow grooves.

This disclosure has been described based on one of the embodiments, but this disclosure is not limited to this embodiment and includes a variety of modifications. For example, in the modification illustrated in FIG. 6, one shallow groove 15 that extends along the tread width direction and opens to the circumferential grooves 2 at bending locations where the circumferential grooves 2 protrude outward in the tread width direction is provided in the block 6. Opening grooves 17 that extend from the tread edge along the tread width direction and open to the circumferential grooves 2 are provided in the lugs 4. Recessed portions 18, 19 are provided in the block 6 at two locations where the block 6 is recessed inward from the outer circumferential periphery at bending locations where the circumferential grooves 2 protrude inward in the tread width direction. In the modification illustrated in FIG. 7, one shallow groove 14 that extends at an inclination relative to the tread circumferential direction and the tread width direction and opens to the circumferential grooves 2 is provided in the block 6. Opening grooves 16 that extend from the tread edge at an inclination relative to the tread width direction and open to the circumferential grooves 2 are provided in the lugs 4. Recessed portions 18, 19 are provided in the block 6 at two locations where the block 6 is recessed inward from the outer circumferential periphery at bending locations where the circumferential grooves 2 protrude inward in the tread width direction. In the modification illustrated in FIG. 8, two shallow grooves 7 and 8 that extend along the tread width direction and open to the circumferential grooves 2 and a shallow groove 9 that extends at an inclination relative to the tread circumferential direction and the tread width direction and opens to the shallow grooves 7 and 8 are provided in the block 6. One end of each of the shallow grooves 7 and 8 opens to one of the circumferential grooves 2 at the positions of the recessed portions 18, 19, where the outer circumferential periphery of the block 6 is recessed inwards.

Figure 6:
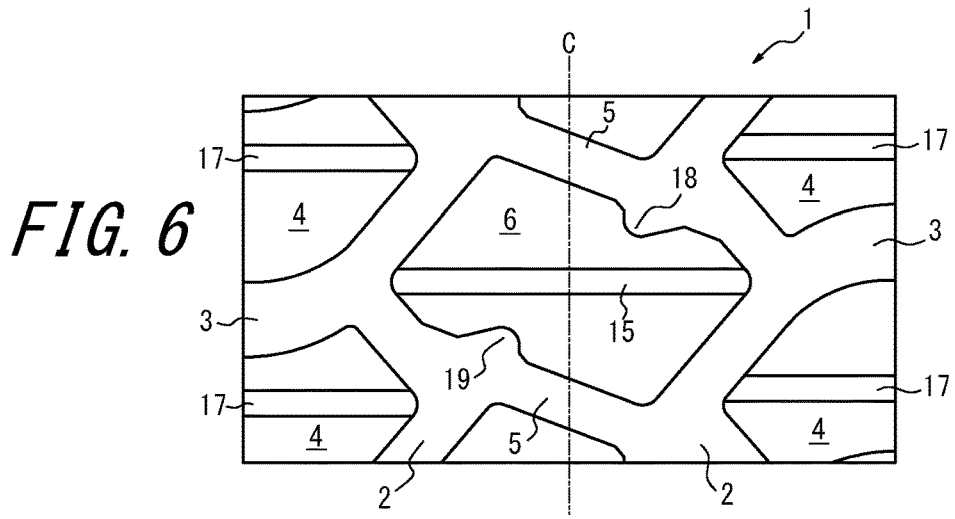
FIG. 6 is a partial developed view of a tread pattern illustrating a modification to one of the embodiments.
Figure 7:
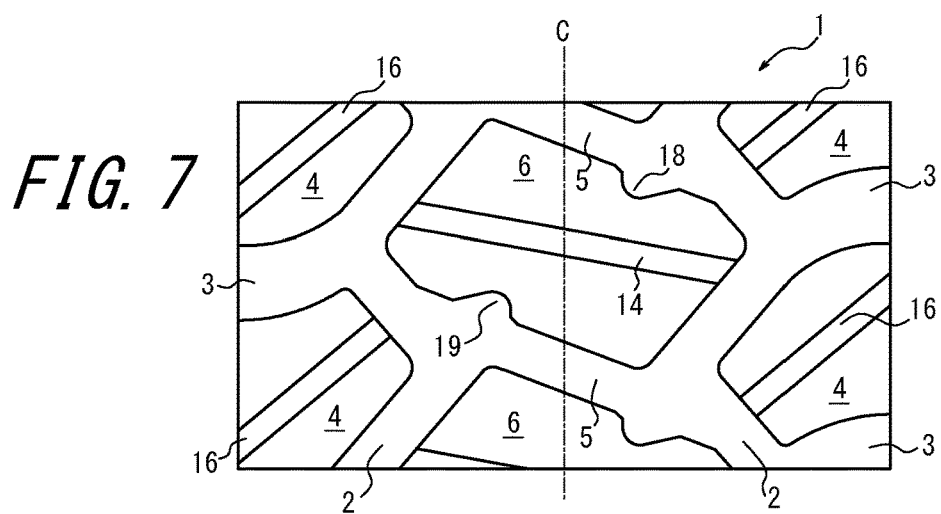
FIG. 7 is a partial developed view of a tread pattern illustrating another modification to one of the embodiments.
Figure 8:
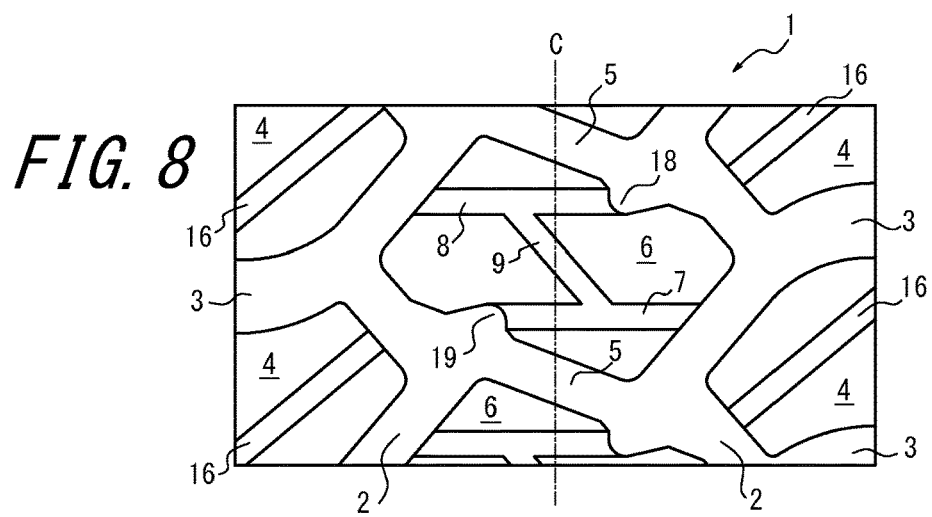
FIG. 8 is a partial developed view of a tread pattern illustrating yet another modification to one of the embodiments.

The shallow groove 15 in the example in FIG. 6, the shallow groove 14 in the example in FIG. 7, and the shallow groove 9 in the example in FIG. 8 are each formed as a raised bottom shallow groove.

Figure 9:
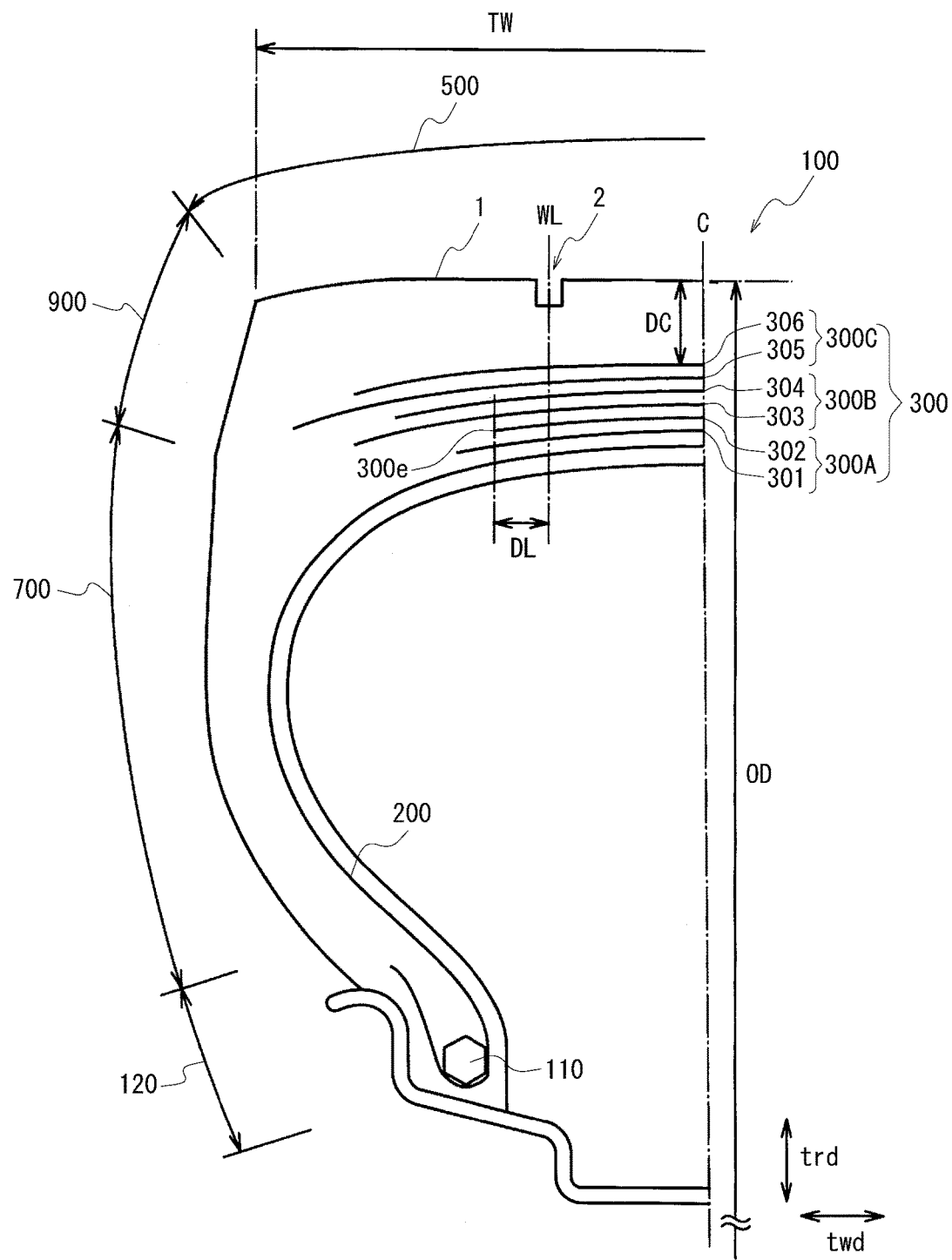
FIG. 9 is a cross-sectional diagram in the tire width direction illustrating the internal structure of a tire in one of the embodiments.

FIG. 9 is a cross-sectional diagram in the tire width direction of a pneumatic tire according to one of the disclosed embodiments, in particular illustrating the tire internal structure of a heavy duty tire for a construction vehicle or the like. As illustrated in FIG. 9, as compared to a pneumatic tire mounted on a passenger vehicle or the like, the tread portion 500 in this tire 100 has a thick rubber gauge (rubber thickness). The internal structure of a tire described below can be applied to each of the tires having the tread patterns described with reference to FIGS. 1 to 8.

Specifically, the tire 100 has a tire outer diameter OD and a rubber gauge DC of the tread portion 500 at the position of a tire equatorial plane C that satisfy the relationship $DC/OD \geq 0.015$.

The tire outer diameter OD (units: mm) refers to a diameter of the tire 100 in a portion (generally, the tread portion 500 in the vicinity of the tire equator plane C) where the outer diameter of the tire 100 reaches its maximum. The rubber gauge DC (units: mm) refers to a rubber thickness of the tread portion 500 at the position of the tire equatorial plane C. The thickness of the belt 300 is not included in the rubber gauge DC. In the case where a circumferential groove is formed in a position including the tire equatorial plane C, the rubber gauge DC refers to a rubber thickness of the tread portion 500 at a position adjacent to the circumferential groove.

As illustrated in FIG. 9, the tire 100 includes a pair of bead cores 110, a carcass 200, and a belt 300 composed of a plurality of belt layers. FIG. 9 shows only a half width of the tire 1, but the other non-illustrated half width of the tire 1 has the same structure.

The bead core 110 is provided in a bead portion 120. The bead core 110 is formed from a bead wire (not illustrated).

The carcass 200 forms the skeleton of the tire 100. The carcass 200 is positioned to extend from the tread portion 500 across a buttress 900 and a sidewall 700 to the bead portion 120.

The carcass 200 has a toroidal shape spanning the pair of bead cores 110. In this embodiment, the carcass 200 wraps around the bead cores 110. The carcass 200 is in contact with the bead cores 110. The carcass 200 is supported at both ends in the tire width direction twd by the pair of bead portions 120.

The carcass 200 includes a carcass cord that, in plan view from the tread surface 1, extends in a predetermined direction. In this embodiment, the carcass cord extends along the tire width direction twd. Steel wire, for example, is used as the carcass cord.

The belt 300 is provided in the tread portion 500. The belt 300 is positioned on the outside of the carcass 200 in the tire radial direction trd. The belt 300 extends in the tire circumferential direction. The belt 300 includes belt cords that extend at an inclination relative to the predetermined direction in which the carcass cord extends. Steel cords, for example, are used as the belt cords.

The belt 300 formed by a plurality of belt layers includes a first belt layer 301, a second belt layer 302, a third belt layer 303, a fourth belt layer 304, a fifth belt layer 305, and a sixth belt layer 306.

The first belt layer 301 is positioned on the outside of the carcass 200 in the tire radial direction trd. The first belt layer 301 is positioned furthest inward in the tire radial direction trd within the belt 300 formed by the plurality of belt layers. The second belt layer 302 is positioned on the outside of the first belt layer 301 in the tire radial direction trd. The third belt layer 303 is positioned on the outside of the second belt layer 302 in the tire radial direction trd. The fourth belt layer 304 is positioned on the outside of the third belt layer 303 in the tire radial direction trd. The fifth belt layer 305 is positioned on the outside of the fourth belt layer 304 in the tire radial direction trd. The sixth belt layer 306 is positioned on the outside of the fifth belt layer 305 in the tire radial direction trd. The sixth belt layer 306 is positioned on the outermost side, in the tire radial direction trd, among the plurality of belt layers constituting the belt 300. From the inside to the outside in the tire radial direction trd, the belt layers are disposed in the order of the first belt layer 301, second belt layer 302, third belt layer 303, fourth belt layer 304, fifth belt layer 305, and sixth belt layer 306.

In this embodiment, in the tire width direction twd, the first belt layer 301 and the second belt layer 302 each have a width (which is measured along the tire width direction twd; hereinafter the same) that is 25% or more to 70% or less of the tread width TW. In the tire width direction twd, the third belt layer 303 and the fourth belt layer 304 each have a width that is 55% or more to 90% or less of the tread width TW. In the tire width direction twd, the fifth belt layer 305 and the sixth belt layer 306 each have a width that is 60% or more to 110% or less of the tread width TW.

In this embodiment, in the tire width direction twd, the fifth belt layer 305 is larger in width than the third belt layer 303, the third belt layer 303 is equal to or larger in width than the sixth belt layer 306, the sixth belt layer 306 is larger in width than the fourth belt layer 304, the fourth belt layer 304 is larger in width than the first belt layer 301, and the first belt layer 301 is larger in width than the second belt layer 302. In the tire width direction twd, of the plurality of belt layers constituting the belt 300, the fifth belt layer 305 is largest in width and the second belt layer 302 is smallest in width. Accordingly, the belt 300 composed of a plurality of belt layers includes a shortest belt layer (i.e., the second belt layer 302) that is shortest in length in the tire width direction twd.

The second belt layer 302 as the shortest belt layer has a belt end 300e, which is the edge in the tire width direction twd.

In this embodiment, in plan view from the tread surface 1 side, the belt cords of the first belt layer 301 and the second belt layer 302 have an inclination angle of 70° or more to 85° or less relative to the carcass cord. The belt cords of the third belt layer 303 and the fourth belt layer 304 have an inclination angle of 50° or more to 75° or less relative to the carcass cord. The belt cords of the fifth belt layer 305 and the sixth belt layer 306 have an inclination angle of 50° or more to 70° or less relative to the carcass cord.

The belt 300 composed of a plurality of belt layers includes an inner intersecting belt group 300A, an intermediate intersecting belt group 300B, and an outer intersecting belt group 300C. The intersecting belt groups 300A to 300C each refer to a group of a plurality of belt layers in which, in plan view from the tread surface 1, the belt cords composing the belt layers within the group intersect between belt layers that are adjacent within the group (preferably with the tire equatorial plane therebetween).

The inner intersecting belt group 300A includes a pair of belt layers and is positioned on the outside of the carcass 200 in the tire radial direction trd. The inner intersecting belt group 300A is formed by the first belt layer 301 and the second belt layer 302. The intermediate intersecting belt group 300B includes a pair of belt layers and is positioned on the outside of the inner intersecting belt group 300A in the tire radial direction trd. The intermediate intersecting belt group 300B is formed by the third belt layer 303 and the fourth belt layer 304. The outer intersecting belt group 300C includes a pair of belt layers, and is positioned on the outside of the intermediate intersecting belt group 300B in the tire radial direction trd. The outer intersecting belt group 300C is formed by the fifth belt layer 305 and the sixth belt layer 306.

In the tire width direction twd, the inner intersecting belt group 300A has a width that is 25% or more to 70% or less of the tread width TW. In the tire width direction twd, the intermediate intersecting belt group 300B has a width that is 55% or more to 90% or less of the tread width TW. In the tire width direction twd, the outer intersecting belt group 300C has a width that is 60% or more to 110% or less of the tread width TW.

In plan view from the tread surface 1, the inclination angle of the belt cords of the inner intersecting belt group 300A relative to the carcass cord is 70° or more to 85° or less. In plan view from the tread surface 1, the inclination angle of the belt cords of the intermediate intersecting belt group 300B relative to the carcass cord is 50° or more to 75° or less. In plan view from the tread surface 1, the inclination angle of the belt cords of the outer intersecting belt group 300C relative to the carcass cord is 50° or more to 70° or less.

In plan view from the tread surface 1, the inclination angle of the belt cords relative to the carcass cord is the greatest for the inner intersecting belt group 300A. The inclination angle of the belt cords of the intermediate intersecting belt group 300B relative to the carcass cord is equal to or greater than the inclination angle of the belt cords of the outer intersecting belt group 300C relative to the carcass cord.

As illustrated in FIG. 9, the length DL along the tire width direction twd is set to be 200 mm or less. The length DL is the length from the belt end 300e to the innermost position, in the tire width direction, of a groove width center line WL of the circumferential groove 2 in plan view of the tire 100 from the tread surface 1 (in plan view from the tread surface 1 in the above-described examples in FIGS. 1 to 8, the position of the bending locati on, inwards in the tire width direction, of the groove width center line WL of the circumferential groove 2 that extends in a zigzag shape).

EXAMPLES

Sample pneumatic tires according to this disclosure were produced, and the performance thereof was evaluated as described below. The tire size for each sample tire was 27.00R49. For Comparative Example Tires 1 and 2 and Example Tires 1 to 3 having the tread pattern in FIG. 1, a different type of shallow groove 9 was formed at the same location in the tread pattern. Six of each sample tire were produced, and the following tests were performed. In Comparative Example Tires 1 and 2, the groove depth of the shallow groove 9 was constant along the entire length thereof, with the shallow groove 9 in Comparative Example Tire 2 being shallower than the shallow groove 9 in Comparative Example Tire 1. In Example Tires 1 to 3, the shallow groove 9 is a raised bottom shallow groove such that the groove depth of the shallow groove 9 gradually increases from the central position of the block in the tire width direction towards the ends in the tire width direction. The form of the groove bottom at which the groove depth is increased is linear (a straight line) in Example Tire 1, as in FIG. 2; a convex shape facing outwards in the tire radial direction in Example Tire 2, as in FIG. 4; and a concave shape facing outwards in the tire radial direction in Example Tire 3, as in FIG. 5.

[Stone-Trapping Resistance]

After being mounted on a dump truck, and under conditions conforming to TRA (internal pressure of 700 kPa, load of 9.5 tons, rim width of 19.5 inches, and flange width of 4.0 inches), each sample tire was driven over a route for a fixed time under the same conditions, and the rate of occurrence of stone trapping in the blocks 6 that extend across the tire equatorial plane C was calculated. The rate of occurrence of stone trapping was calculated with the following equation.

rate of occurrence of stone trapping=(number of blocks in which stone trapping occurred among blocks extending across tire equatorial plane)/ (total number of blocks extending across tire equatorial plane)

[Block Breakoff Resistance]

After being mounted on a dump truck, and under the above conditions conforming to TRA, each sample tire was driven over a route for a fixed time under the same conditions, and the rate of occurrence of block breakoff in the blocks 6 that extend across the tire equatorial plane C was calculated. The rate of occurrence of block breakoff was calculated with the following equation.

rate of occurrence of block breakoff=(number of blocks in which block breakoff occurred among blocks extending across tire equatorial plane)/ (total number of blocks extending across tire equatorial plane)

[Slip Resistance]

After being mounted on a dump truck, and under the above conditions conforming to TRA, each sample tire was driven over a route under the same conditions, and after a fixed time had elapsed, the distance that the vehicle had advanced (travel distance) was measured with GPS and compared to the distance calculated from the number of revolutions of the tire (rotation distance) to calculate the slip rate. The slip rate can be calculated with the following equation.

slip rate=(rotation distance−travel distance)/(travel distance)

These test results are listed in Table 1, along with the specifications of each sample tire. The values calculated as described above for the stone-trapping resistance, block breakoff resistance, and slip resistance are expressed as indices, taking Comparative Example Tire 1 as a standard. A smaller numerical value indicates better performance.

and block breakoff resistance improve. From these results, it is clear that according to the pneumatic tire of this disclosure, the block rigidity and hence the stone-trapping resistance and block breakoff resistance can be greatly improved, while guaranteeing good mud drainage and hence good slip resistance.

REFERENCE SIGNS LIST

1 Tread surface
2 Circumferential groove
3 Lug groove
4 Lug
5 Transverse groove
6 Block
7-9, 14, 15, 31, 32 Shallow groove
16, 17, 30 Opening groove
18, 19 Recessed portion
100 Tire
120 Bead portion
200 Carcass
300 Belt
301 First belt layer
302 Second belt layer
303 Third belt layer
304 Fourth belt layer
305 Fifth belt layer
306 Sixth belt layer
300A Inner intersecting belt group
300B Intermediate intersecting belt group
300C Outer intersecting belt group
300e Belt edge
500 Tread
700 Sidewall
900 Buttress
C Tire equatorial plane
TW Tread width

The invention claimed is:
1. A heavy duty pneumatic tire comprising:
on a tread surface,
   two or more circumferential grooves extending continuously in a tire circumferential direction;

TABLE 1

|  | Comparative Example Tire 1 | Comparative Example Tire 2 | Example Tire 1 | Example Tire 2 | Example Tire 3 |
|---|---|---|---|---|---|
| tread pattern |  | FIG. 1 |  |  |  |
| change in groove depth | constant | constant | linear | convex | concave |
| a (mm) | 37.5 | 30 | 25 | 25 | 25 |
| b (mm) | 37.5 | 30 | 37.5 | 37.5 | 37.5 |
| d (mm) | 25 | 25 | 25 | 25 | 25 |
| OTD (mm) | 75 | 75 | 75 | 75 | 75 |
| c (°) | 4 | 4 | 10 | 10 | 10 |
| stone-trapping resistance (index) | 100 | 25 | 40 | 30 | 80 |
| block breakoff resistance (index) | 100 | 35 | 50 | 40 | 90 |
| slip resistance (index) | 100 | 120 | 103 | 115 | 105 |

As is clear from the results in Table 1, as compared to Comparative Example Tire 1, Comparative Example Tire 2 has better stone-trapping resistance and block breakoff resistance, but the slip resistance deteriorates greatly. On the other hand, as compared to Comparative Example Tire 1, Example Tires 1 to 3 have improved flow of mud within the grooves, even though the groove volume of the shallow groove is reduced. Therefore, the slip resistance does not greatly deteriorate, whereas the stone-trapping resistance a plurality of transverse grooves opening to circumferential grooves, among the two or more circumferential grooves, that are adjacent in a tire width direction; and
a block defined by the circumferential grooves and the transverse grooves and extending across a tire equatorial plane;
wherein one or more shallow grooves is formed in the block, each of the one or more shallow grooves having an average groove depth that is shallower than a maximum groove depth of the circumferential grooves adjacent to the block;

wherein at least one of the one or more shallow grooves is a raised bottom shallow groove that is in communication, directly or via another one of the one or more shallow grooves, with at least one groove among the circumferential grooves and the transverse grooves adjacent to the block, extends in a direction intersecting the tire circumferential direction at least in a central portion of the block in the tire width direction, and has a groove depth that is shallower in the central portion of the block in the tire width direction than at an end of the raised bottom shallow groove in the tire width direction;

wherein $OTD/3 \le a < OTD/2$, and $a < b \le OTD/2$, where OTD is a maximum groove depth of the circumferential grooves adjacent to the block, a is a minimum groove depth of the raised bottom shallow groove in the central portion of the block in the tire width direction, and b is a maximum groove depth of the raised bottom shallow groove at the end of the raised bottom shallow groove in the tire width direction;

wherein a groove width of the raised bottom shallow groove in the central portion of the block in the tire width direction is equal to or greater than the minimum groove depth of the raised bottom shallow groove in the central portion of the block in the tire width direction;

wherein a first end of the raised bottom shallow groove opens to a first one of the one or more shallow grooves, and a second end of the raised bottom shallow groove opens up to a second one of the one or more shallow grooves;

wherein a corner of a block portion of the block, formed where the second one of the one or more shallow grooves is opened to either of one of the circumferential grooves adjacent to the block or one of the transverse grooves adjacent to the block, has a rounded shape;

wherein the raised bottom shallow groove and the first one of the one or more shallow grooves form a T shape, or the raised bottom shallow groove and the second one of the one or more shallow grooves form a T shape; and wherein $DC/OD \ge 0.015$, where DC is a rubber gauge of a tread portion at a tire equatorial plane, and OD is an outer tire diameter at the tire equatorial plane.

2. The heavy duty pneumatic tire of claim 1, wherein the raised bottom shallow groove includes an inclined bottom portion where the groove depth of the raised bottom shallow groove increases linearly from a position of a minimum groove depth of the raised bottom shallow groove in the central portion of the block in the tire width direction towards the end of the raised bottom shallow groove in the tire width direction.

3. The heavy duty pneumatic tire of claim 2, wherein an inclination angle, at an acute angle side, of a groove bottom in the inclined bottom portion of the raised bottom shallow groove is from 5° to 15° relative to the tread surface.

4. The heavy duty pneumatic tire of claim 1, wherein in a cross-section of the raised bottom shallow groove in a groove width direction, an inclination angle, at an acute angle side, of a groove wall surface of the raised bottom shallow groove in the central portion of the block in the tire width direction is greater than 4° relative to a normal to the tread surface.

5. The heavy duty pneumatic tire of claim 1, wherein the raised bottom shallow groove includes a convex bottom portion where, from the position of the minimum groove depth of the raised bottom shallow groove towards the ends of the raised bottom shallow groove in the tire width direction, the groove depth increases in a cross-section along a groove width center so that a groove bottom has a convex shape facing outwards in a tire radial direction.

6. The heavy duty pneumatic tire of claim 1, wherein the raised bottom shallow groove includes a concave bottom portion where, from the position of the minimum groove depth of the raised bottom shallow groove towards the ends of the raised bottom shallow groove in the tire width direction, the groove depth increases in a cross-section along a groove width center so that a groove bottom has a concave shape facing outwards in a tire radial direction.

7. The heavy duty pneumatic tire of claim 1, wherein among all of the one or more shallow groves, only the shallow groove which extends across the tire equatorial plane is formed as the raised bottom shallow groove, and the other ones of the one or more shallow grooves are set to have a groove depth that is constant along an entire length thereof.

8. The heavy duty pneumatic tire of claim 1, wherein the groove depth of the raised bottom shallow groove becomes deeper intermittently from the central portion of the block in the tire width direction to the ends of the shallow groove in the tire width direction.

9. The heavy duty pneumatic tire of claim 1, wherein in the tire width direction, a first belt layer and a second belt layer each have a width that is 25% or more than and 70% or less than a tread width.

10. The heavy duty pneumatic tire of claim 9, wherein in the tire width direction, a third belt layer and a fourth belt layer each have a width that is 55% or more than and 90% or less than the tread width.

11. The heavy duty pneumatic tire of claim 10, wherein in the tire width direction, a fifth belt layer and a sixth belt layer each have a width that is 60% or more than and 110% or less of than the tread width.

12. The heavy duty pneumatic tire of claim 11, wherein in the tire width direction, the width of the fifth belt layer is larger than the width of the third belt layer, the width of the third belt layer is equal to or larger than the width of the sixth belt layer, the width of the sixth belt layer is larger than the width of the fourth belt layer, the width of the fourth belt layer is larger than the width of the first belt layer, and the width of the first belt layer is larger than the width of the second belt layer.

13. The heavy duty pneumatic tire of claim 11, wherein in a plan view from a tread surface side, belt cords of the first belt layer and the second belt layer each have an inclination angle that is 70° or more to 85° or less relative to a carcass cord.

14. The heavy duty pneumatic tire of claim 13, wherein in the plan view from the tread surface side, belt cords of the third belt layer and the fourth belt layer each have an inclination angle that is 50° or more to 75° or less relative to the carcass cord.

15. The heavy duty pneumatic tire of claim 14, wherein in the plan view from the tread surface side, belt cords of the fifth belt layer and the sixth belt layer each have an inclination angle that is 50° or more to 70° or less relative to the carcass cord.

16. The heavy duty pneumatic tire of claim 11, in a plan view from a tread surface side, an inclination angle of belt cords relative to a carcass cord is the greatest for an inner intersecting belt group including the first belt layer and the second belt layer, and an inclination angle of the belt cords of an intermediate intersecting belt group, including the third belt layer and the fourth belt layer, relative to the carcass cord is equal to or greater than an inclination angle of belt cords of an outer intersecting belt group, including the fifth belt layer and the sixth belt layer, relative to the carcass cord.

17. The heavy duty pneumatic tire of claim 11, wherein a length DL, in the tire width direction, is 200 mm or less, and
wherein the length DL is a length from an axially outermost end of the second belt layer to an innermost position, in the tire width direction, of a groove width center line of a circumferential groove among the circumferential grooves adjacent to the block.

18. A heavy duty pneumatic tire comprising:
on a tread surface,
two or more circumferential grooves extending continuously in a tire circumferential direction;
a plurality of transverse grooves opening to circumferential grooves, among the two or more circumferential grooves, that are adjacent in a tire width direction; and
a block defined by the circumferential grooves and the transverse grooves and extending across a tire equatorial plane;
wherein one or more shallow grooves is formed in the block, each of the one or more shallow grooves having an average groove depth that is shallower than a maximum groove depth of the circumferential grooves adjacent to the block;
wherein at least one of the one or more shallow grooves is a raised bottom shallow groove that is in communication, directly or via another one of the one or more shallow grooves, with at least one groove among the circumferential grooves and the transverse grooves adjacent to the block, extends in a direction intersecting the tire circumferential direction at least in a central portion of the block in the tire width direction, and has a groove depth that is shallower in the central portion of the block in the tire width direction than at an end of the raised bottom shallow groove in the tire width direction;
wherein $OTD/3 \le a < OTD/2$, and $a < b \le OTD/2$, where OTD is a maximum groove depth of the circumferential grooves adjacent to the block, a is a minimum groove depth of the raised bottom shallow groove in the central portion of the block in the tire width direction, and b is a maximum groove depth of the raised bottom shallow groove at the end of the raised bottom shallow groove in the tire width direction;
wherein in a cross-section of the raised bottom shallow groove in a groove width direction, an inclination angle, at an acute angle side, of a groove wall surface of the raised bottom shallow groove in the central portion of the block in the tire width direction is greater than 4° relative to a normal to the tread surface;
wherein a groove width of the raised bottom shallow groove in the central portion of the block in the tire width direction is equal to or greater than a minimum groove depth of the raised bottom shallow groove in the central portion of the block in the tire width direction;
wherein a first end of the raised bottom shallow groove opens to a first one of the one or more shallow grooves, and a second end of the raised bottom shallow groove opens up to a second one of the one or more shallow grooves;
wherein a corner of a block portion of the block, formed where the second one of the one or more shallow grooves is opened to either of one of the circumferential grooves adjacent to the block or one of the transverse grooves adjacent to the block, has a rounded shape;
wherein the raised bottom shallow groove and the first one of the one or more shallow grooves form a T shape, or the raised bottom shallow groove and the second one of the one or more shallow grooves form a T shape; and
wherein $DC/OD \ge 0.015$, where DC is a rubber gauge of a tread portion at a tire equatorial plane, and OD is an outer tire diameter at the tire equatorial plane;
wherein
the raised bottom shallow groove includes a convex bottom portion where, from the position of the minimum groove depth of the raised bottom shallow groove towards the ends of the raised bottom shallow groove in the tire width direction, the groove depth increases in a cross-section along a groove width center so that a groove bottom has a convex shape facing outwards in a tire radial direction, or
the raised bottom shallow groove includes a concave bottom portion where, from the position of the minimum groove depth of the raised bottom shallow groove towards the ends of the raised bottom shallow groove in the tire width direction, the groove depth increases in the cross-section along the groove width center so that the groove bottom has a concave shape facing outwards in the tire radial direction;
wherein among all of the one or more shallow groves, only the shallow groove which extends across the tire equatorial plane is formed as the raised bottom shallow groove, and the other ones of the one or more shallow grooves are set to have a groove depth that is constant along an entire length thereof;
wherein in the tire width direction, a first belt layer and a second belt layer each have a width that is 25% or more than and 70% or less than a tread width;
wherein in the tire width direction, a third belt layer and a fourth belt layer each have a width that is 55% or more than and 90% or less than the tread width;
wherein in the tire width direction, a fifth belt layer and a sixth belt layer each have a width that is 60% or more than and 110% or less of than the tread width;
wherein in the tire width direction, the width of the fifth belt layer is larger than the width of the third belt layer, the width of the third belt layer is equal to or larger than the width of the sixth belt layer, the width of the sixth belt layer is larger than the width of the fourth belt layer, the width of the fourth belt layer is larger than the width of the first belt layer, and the width of the first belt layer is larger than the width of the second belt layer; and wherein in a plan view from a tread surface side, belt cords of the first belt layer and the second belt layer each have an inclination angle that is 70° or more to 85° or less relative to a carcass cord.

\* \* \* \* \*